United States Patent [19]
Hasler

[11] 3,739,211
[45] June 12, 1973

[54] MAGNETIC TACHOMETER
[75] Inventor: Alfred Hasler, Mountain View, Calif.
[73] Assignee: Amper Corporation, Redwood City, Calif.
[22] Filed: Oct. 15, 1971
[21] Appl. No.: 189,685

[52] U.S. Cl. .............................. 310/168, 310/171
[51] Int. Cl. .......................................... H02k 19/24
[58] Field of Search ................... 310/70, 168, 169, 310/170, 171, 156

[56] References Cited
UNITED STATES PATENTS
| | | | |
|---|---|---|---|
| 3,504,538 | 4/1970 | Andrews | 310/168 |
| 3,649,859 | 3/1972 | Watt | 310/168 |
| 3,604,966 | 9/1971 | Liggett | 310/168 |
| 3,541,368 | 11/1970 | Jones | 310/168 |
| 3,646,376 | 2/1972 | Anderson | 310/171 |
| 3,504,208 | 3/1970 | Rivers | 310/70 |
| 3,486,054 | 12/1969 | Livingston | 310/171 |

Primary Examiner—R. Skudy
Attorney—Robert G. Clay

[57] ABSTRACT

A pair of toothed elements of magnetically permeable material are coaxially mounted for relative rotation with their teeth spaced opposed in rotational registration. The toothed elements are further mounted in magnetic circuit with magnets and a coil whereby magnetic flux provided by the magnets follows two separate magnetically parallel flux paths including the pair of toothed elements and the coil. As the toothed elements are relatively rotated, the net reluctance of the flux path through the tooth elements varies and causes a voltage to be induced in the coil which alternates at a frequency representative of the relative speed of rotation of the toothed elements. The other of the magnetically parallel flux paths is of a fixed reluctance and does not extend through the pair of toothed elements.

7 Claims, 4 Drawing Figures

Patented June 12, 1973
3,739,211
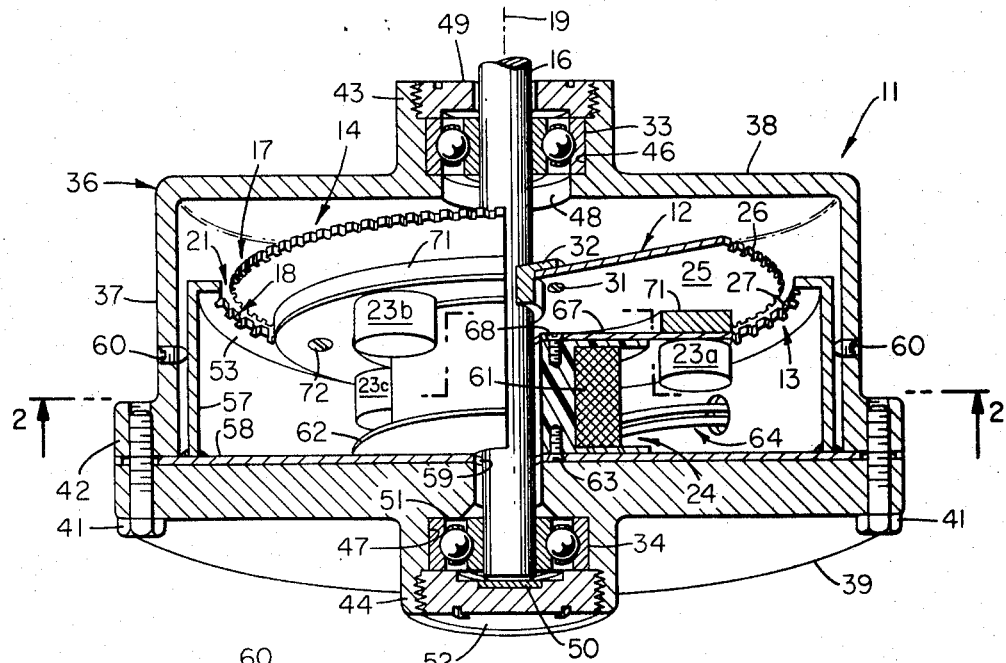
FIG_1
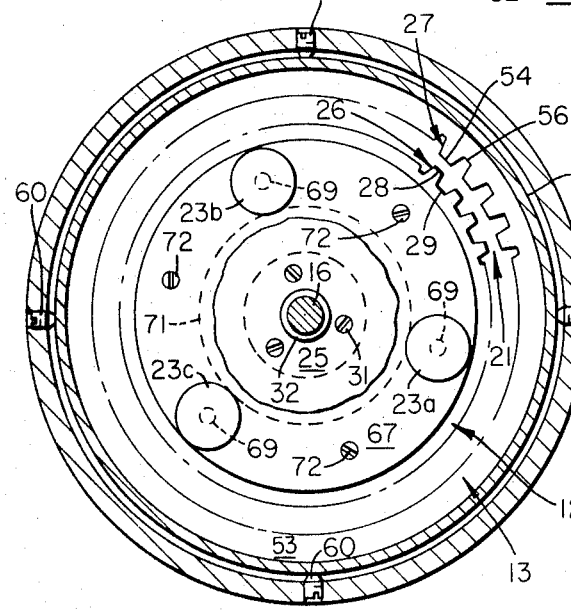
FIG_2
FIG_3
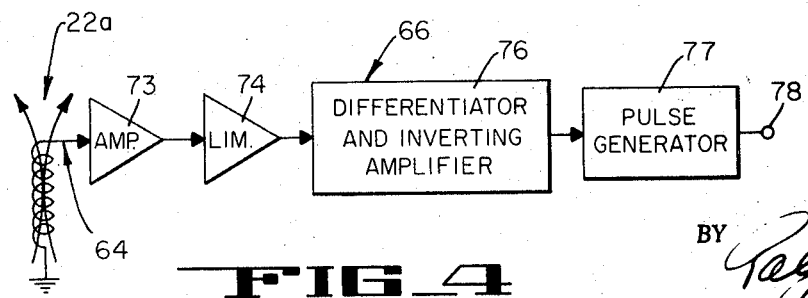
FIG_4
INVENTOR.
ALFRED NMI HASLER
BY
Ralph L. Mossino
ATTORNEY

MAGNETIC TACHOMETER

FIELD OF THE INVENTION

The present invention generally relates to tachometers and, more particularly to magnetic tachometers inherently free of rotationally eccentric errors.

BACKGROUND OF THE INVENTION

Tachometers are used to provide indications of the angular velocity of rotating equipment, usually motors. One of the more common applications of tachometers is in servo systems for controlling the speed of rotating equipment. In such applications, the tachometer is employed to sense and provide a signal representative of the angular velocity or speed of the rotating equipment. This signal is compared with a known reference representative of a desired speed and, if the speed of the rotating equipment is other than the desired speed, a corrective error signal is generated. The error signal is coupled to the rotating equipment's drive system to correct the speed of the rotating equipment. Precise speed control in such servo systems is dependent upon the tachometer providing a signal that accurately represents the angular displacement of the rotating equipment.

Typical precision tachometers, both magnetic and optical, include a rotatable disc having sensible, distinctive indicies or marks located thereon at precise angular intervals. A stationary detector is located to detect the marks as the disc is rotated with the rotating equipment. Some tachometers employ a single detector located at one position relative to the circumference of the disc and others employ two detectors located at diametrically opposite positions relative to the circumference of the disc. Great care must be exercised in manufacturing, assemblying and aligning these precision tachometers in order to minimize rotational eccentricity and attendant errors in the provided speed representative signals. Some of the more common sources of rotational eccentricity are misalignment of the axis of the sensible marks and the axis of rotation of the disc, and variations in the angular spacing between the sensible marks. While rotational eccentricity can initially be minimized by the use of careful manufacturing, assemblying and aligning techniques in the construction of the tachometers, such techniques are costly. Furthermore, such techniques do not entirely eliminate rotational eccentricity. Subsequent exposures to substantial physical disturbances often cause misalignments, which introduce or increase the rotational eccentricity.

Considerable advantage is therefore to be gained from a tachometer construction that is free of errors caused by the presence of rotational eccentricity. Additional advantages will be realized by simplifying and reducing the cost of construction of precision tachometers.

SUMMARY OF THE INVENTION

Accordingly, it is an object of this invention to provide a tachometer structure inherently less susceptible to errors caused by the presence of rotational eccentricity.

More particularly, it is an object of this invention to provide a tachometer structure that facilitates the manufacture, assembly and alignment of a tachometer.

Another object of this invention is to provide a tachometer structure that permits precision tachometers to be used in environments where they may encounter large physical disturbances.

A further object of this invention is to provide a tachometer structure that does not require the precise alignment of its component parts for the construction of a precision tachometer.

It is still another object of this invention to provide an inexpensive tachometer able to indicate precisely the angular velocity of rotating equipment.

In accordance with the present invention, two members of magnetically permeable material are mounted for relative rotation about an axis with facing portions, which extend circumaxially about the axis, spaced opposed in rotational registration. The members are located to form a magnetic circuit with a magnet and a magnetic flux detector whereby magnetic flux provided by the magnet follows a path extending between the spaced opposed portions of the members through the region therebetween and a path along which the magnetic flux detector is located. Each member is provided with means for establishing different reluctances in the flux path between the spaced opposed portions at a plurality of angular intervals about the axis. As the magnetically permeable members are relatively rotated, the reluctance of the flux path extending through both of the members varies. The varying reluctance causes the flux in the magnetic circuit to vary. This variation in the flux is detected by the magnetic flux detector. Since the reluctance will vary according to the rate of relative angular displacement of the relatively rotated members, the magnetic flux detector can be arranged to issue signals whose frequencies are representative of the rate.

The magnetic flux passes between the spaced opposed portions around their entire rotationally registered locations. As the members are relatively rotated, the locations of different reluctances associated with each of the members pass into and out of registration with those of the other member. Each location of different reluctance associated with one member passing into and out of registration with each location of different reluctance associated with the other member causes a cyclical flux change in the magnetic circuit. Since this occurs around the entire spaced opposed portions of the relatively rotated members, the sum of all cyclical flux changes occurring around the entire rotationally registered portions represents the cyclical variation of the flux in or reluctance of the flux path of the magnetic circuit.

By establishing a flux path around the entire relatively rotated members whose reluctance varies at several locations thereabout as the members are relatively rotated and summing the flux changes that occur at the several locations to obtain a signal representative of the relative angular displacement of the relatively rotated members, the cyclical variation of the flux will accurately represent the relative angular displacement of the relatively rotated members. Apparent changes in the angular displacement per unit time characteristic of the previously discussed prior art tachometers as a result of the presence of rotational eccentricity or varying angular spacing between the sensible marks are essentially eliminated by the averaging effect obtained by summing cyclical flux changes occurring around the entire rotationally registered spaced opposed portions. Because the tachometer structure of the present invention is inherently less susceptible to errors caused by the presence of rotational eccentricity, the manufacture, assembly and alignment of the tachometer are simplified and less expensive. Moreover, since it is less susceptible to such errors, the tachometer is better able to withstand large physical disturbances.

BRIEF DESCRIPTION OF DRAWING

The foregoing and other advantages and features of the present invention will become more apparent from the following description and claims considered together with the accompanying drawing of a preferred embodiment of which:

FIG. 1 is a perspective, partially sectioned view of one embodiment of the tachometer of the present invention.

FIG. 2 is an axial cross section of the tachometer of FIG. 1 taken along lines 2—2.

FIG. 3 is a schematic diagram of the tachometer of FIG. 1 showing the paths of magnetic flux.

FIG. 4 is a block diagram illustrating one use of the tachometer of the present invention.

DESCRIPTION OF PREFERRED EMBODIMENT

Referring to FIGS. 1 and 2, the present invention is a magnetic tachometer 11 of the type including a first magnetically permeable member or tachometer wheel 12 mounted for relative rotation with a second magnetically permeable pickup member 13, which preferably is stationary with respect to the tachometer wheel 12. The tachometer wheel 12 is provided with magnetically sensible indices 14 at circumaxially spaced locations. These indices are detected by the tachometer pick-up member 13 as the wheel 12 is rotated to provide an indication of either the angular displacement or rotational velocity of the wheel 12. The tachometer wheel 12 is mounted for rotation with a shaft 16 adapted to be coupled to the rotating member of rotating equipment, such as a capstan or transport motor of a magnetic tape transport mechanism (not shown).

In accordance with the present invention, the margins of the tachometer wheel 12 and of the pick-up member 13 define rotationally registered spaced opposed facing portions 17 and 18 extending circumaxially about the axis 19 of rotation of the tachometer wheel 12. In the illustrated embodiment, the facing portions 17 and 18 lie in the same radial plane of the tachometer wheel 12. However, wheel 12 and pick-up member 13 may be constructed with the circumaxial facing portions in other alignments, such as perpendicular to the radial plane of the wheel 12 or in a plane parallel or at an angle to the radial plane of the wheel 12.

A region 21 is provided between the spaced opposed facing portions 17 and 18, preferably, having a higher reluctance than the magnetically permeable wheel 12 and pick-up member 13. To facilitate the construction and operation of the tachometer 11, the magnetically permeable wheel 12 and pick-up member 13 are relatively located to define an annular high reluctance air gap region 21 between the spaced opposed facing portions 17 and 18.

The facing portions 17 and 18 separated by the annular air gap 21 form part of a magnetic circuit 22 (see FIG. 3) including a source 23 of magnetic flux and a magnetic flux detector 24. The elements of the tachometer 11 are arranged to form a magnetic circuit 22 having two paths for the magnetic flux provided by the source 23; a fixed reluctance flux path 22a and a variable reluctance flux path 22b. In the illustrated preferred embodiment, the fixed reluctance flux path 22a is formed by the tachometer wheel 12 and the shaft 16 to which it is mounted. The flux detector 24 is located in the fixed reluctance flux path 22a. The variable reluctance flux path 22b is formed by the tachometer wheel 12, high reluctance air gap 21 and tachometer pick-up member 13. Means 26 and 27 are associated with each of the tachometer members 12 and 13, respectively, to establish different reluctances in the air gap 21 at regular circumaxial intervals about the members. As the tachometer wheel 12 and pick-up member 13 are relatively rotated, the different reluctance means 26 and 27 cause the average reluctance of the variable reluctance flux path 22b through the facing portions 17 and 18 to vary according to the rate of relative angular displacement of the wheel and pick-up member. Because a change in the reluctance of a flux path will cause a change in the distribution of the total magnetic flux provided by a source, such as occurs between the flux path of the magnetic circuit and the flux path of the leakage flux when the reluctance of the magnetic circuit flux path changes, the variation in the average reluctance of the variable reluctance flux path 22b will be reflected as a sensible change in the flux in the fixed reluctance flux path 22a. This sensible change is detected by the flux detector 24 which usually is arranged to responsively generate a signal representative of the rate of relative angular displacement of the wheel 12 and pick-up member 13. It is the means 26 associated with the tachometer wheel or member 12 to establish different reluctances in the variable reluctance flux path 22b that serves as the magnetic sensible indices 14 detected by the pick-up member 13. And it is the means 27 associated with the pick-up member 13 that serves to detect the sensible indices 14 of the tachometer wheel 12.

A more comprehensive understanding of the tachometer 11 of the present invention can be had upon a detailed consideration of the particular construction of the one embodiment of the tachometer 11 illustrated by FIGS. 1 and 2. More particularly, the tachometer wheel 12 is a serrated disc 25 of soft iron having a plurality of outwardly projecting serrations or teeth 28 equally spaced about its circumference and separated by root segments 29. The alternating teeth 28 and root segments 29 are the means 26 that establish different reluctances about the disc 25 and define the sensible indices 14. The serrated disc 25 is fastened proximate its center by screws 31 to a rigid coupler 32 press fit to the shaft 16 to rotate therewith. The coupler 32 and shaft 16 may be arranged to form part of the fixed reluctance flux path 22a and, in such event, would be constructed from a material having a magnetic permeability greater than air. However, as long as a flux leakage path of air is provided between the disc 25 and the flux detector 24, sufficient flux will be coupled to the flux detector 24 to enable the detection of flux changes in the flux path 22a.

The shaft 16 is supported for rotation at its ends by journal bearings 33 and 34 seated within the tachometer housing 36. The tachometer housing 36 includes a cylindrical section 37 having one integral end plate 38 and one demountable end plate 39. The demountable end plate 39 is secured by bolts 41 to a flange 42 extending outwardly from the side of the cylindrical section 37. To house and hold the bearings in place, the end plates 38 and 39 are provided with cylindrical extensions 43 and 44 respectively extending in the direction of the axis 19 outward of the housing 36 to define receptacles 46 and 47 for receiving the journal bearings 33 and 34. In the receptacle 46, the journal bearing 33 is seated on a shoulder 48 at the bottom of the receptacle and held therein by a lockscrew 49 threadingly engaging the open end of the cylindrical extension 43. The lockscrew 49 is aperatured at its center to permit the shaft 16 to extend therethrough and be coupled to the rotating equipment. In the receptacle 47, the journal bearing 34 is seated on the shoulder 51 at the bottom of the receptacle and held therein by a lockscrew 52 threadingly engaging the open end of the cylindrical extension 44. An end trust bearing 50 is interposed the end of the shaft 16 and the lockscrew 52.

Surrounding the serrated disc 25 is a stationary annular member 53 of soft iron having a serrated surface 18 facing the serrated surface 17 of the disc 25. The serrated annular member 53 defines a plurality of projecting serrations or teeth 54 equally spaced about its inner circumference and separated by root segments 56. To keep the reluctance of the space 21 separating the teeth 28 and 54 within limits which permit substantial flux to follow path 22b, the inner radius of the annular member 53 defined by the tips of the teeth 54 is made about five-thousandths of an inch greater than the radius of the disc 25 defined by the tips of the teeth 28. The alternating teeth 54 and root segments 56 form the means 27 for detecting the sensible indices 14, or alternating teeth 28 and root segments 29, of the rotatable disc 25. The number of teeth 54 and their circumferential spacing are selected relative to the number and spacing of teeth 28 of the disc 25 so that all of the teeth 28 simultaneously move into and out of registration with teeth 54 of the annular member 53. Preferrably, the disc 25 and the annular member 53 have the same number of teeth 28 and teeth 54, respectively. Furthermore, the circumaxial width of the teeth 28 at their tips is selected to be less than the corresponding circumaxial width of the teeth 54 to facilitate detecting the alternating teeth 28 and root segments 29 of the rotable disc 25. In one embodiment constructed, the disc 25 had an outside diameter of about 5 ¾ inches and 384 teeth were provided on both the disc 25 and annular member 53, with the teeth 28 of the disc 25 having a circumaxial tip width of ten-thousandths of an inch and the teeth 54 of the annular member 53 a circumaxial tip width of twelve-thousands of an inch. It should be appreciated that the tachometer 11 of the present invention could also be constructed with the disc 25 stationary and annular member 53 rotably mounted. In such an embodiment, the alternating teeth 54 and root segments 56 of the rotably mounted annular member 53 would serve as the sensible indices 14 and the alternating teeth 28 and root segments 29 of the stationary disc 25 would serve as the means for detecting the sensible indices.

The annular member 53 is supported in the same radial plane as the disc 25 by the integral cylindrical member 57 coaxial with the cylindrical housing section 37 and secured as by welding to the disc shaped support plate 58. The support plate 58 is held between the demountable end plate 39 and the housing flange 42 and is provided with a centrally located aperture 59 which permits the shaft 16 to extend to the bearing 34. Enlarged bolt apertures are provided in the support plate 58 to permit it to be moved radially so that the annular member 53 and disc 25 can be aligned about the axis 19. To adjust the relative radial positions of the disc 25 and annular member 53 for optimum output signal and so that they are maintained out of contact; four set screws 60 are located at 90° intervals about the cylindrical section 37 to extend through its wall and bear against the cylindrical member 57. The set screws 60 are adjusted prior to tightening the bolts 41 to center the disc 25 and annular member 53. Once centered for optimum signal output, the bolts are tightened to hold the support plate 58, hence, annular member 53, in place relative to the disc 25.

The support plate 58 also supports the magnetic flux source 23 and magnetic flux detector 24. More particularly, the detector 24 is an induction coil 61 wound on a coil form 62. The coil form 62 is supported by the plate 58 to surround the shaft 16 between the plate 58 and the serrated disc 25. Screws 63 are provided to fasten the coil form 62 to the plate 58. A pair of leads 64 extend through apertures provided in the cylindrical stem 57 and housing section 37 to couple the induction coil 61 to a signal processing system 66 (see FIG. 4).

To support the magnetic flux source 23 relative to the toothed elements 25 and 53, a circular plate 67 is fastened by screws 68 to the end of the coil form 62 proximate the serrated disc 25. The circular plate 67 extends radially beyond the perimeter of the coil form 62 and is apertured at its center to permit the shaft 16 to pass to the bearing 34. Three permanent magnets 23a, 23b and 23c are located at 120° intervals about a circle surrounding the coil form 62 on the side of the plate 67 facing the coil form. Screws 69 are employed to fasten the permanent magnets 23a, b and c to the circular plate 67. Because the plate 67 is spaced from the serrated disc 25 to provide clearance for the coupler 32 and the heads of the screws 31, a magnetically permeable ring 71 is provided between the circular plate 67 and serrated disc 25 to reduce the reluctance of the flux path from the magnets to the serrated disc. The ring 71 is constructed to have a mean radius equal to the radius of the circle about which the permanent magnets 23a, b and c are located and is fastened to the circular plate 67 by screws 72 to overlay the circularly disposed magnets. To allow the serrated disc 25 to rotate freely relative to the stationary ring 71, the ring 71 has an axial thickness which is a few thousandths of an inch less than the distance separating the confronting surfaces of the serrated disc 25 and circular plate 67.

When employed to provide an indication of the speed of rotating equipment such as a motor, the shaft 16 is linked to rotate with the rotating member of the motor. As the motor is driven, the disc 25 rotates with the shaft 16 whereby its teeth 28 alternately pass into and out of registration with the teeth 54 of the stationary annular member 53 at a rate corresponding to the speed of the rotating member. This passing of the teeth 28 and 54 into and out of registration causes the reluctance of the path 22b to vary cyclically at the rate at which the teeth pass into and out of registration. As discussed hereinabove, a change in the reluctance of the path 22b causes a corresponding change in the distribution of the magnetic flux in the paths 22a and 22b. Therefore, the varying reluctance of the path 22b causes a corresponding cyclical variation in the flux in the path 22a. The cyclically varying flux in path 22a induces a corresponding varying voltage signal in the induction coil 61.

However, the induction coil could be located in the path 22b to detect directly the variation of the reluctance by sensing the changing flux in that path. In any event, the induced voltage signal varies at a frequency corresponding to the rate at which the teeth 28 and 54 pass into and out of registration. For example, a tachometer 11 having 384 teeth on both the disc 25 and annular member 53 generates a voltage signal having a frequency equal to the product of 384 and the number of revolutions of disc 25 per second.

The cyclically varying voltage signal induced in the coil 61 is coupled by leads 64 to the signal processing system 66, which operates to condition the signal for use in speed determining or controlling apparatus. The signal processing system 66 illustrated in FIG. 4 is a common system employed in speed control apparatus for converting a cyclically varying speed representative voltage signal to a train of pulses having a pulse repetition rate proportional to the speed of the equipment being controlled. Such systems include a preamplifier 73 whose input is coupled to receive the varying voltage signal present on leads 64. The output of the preamplifier 73 extends to the input of a limiter 74, which is operated as a squaring circuit. The limiter 74 converts the cyclically varying voltage signal to a square waveform with well defined signal state transitions of short durations. A differentiator and inverting amplifier circuit 76 is coupled to receive the square waveform output from the limiter 74 and operates to generate a train of unidirectional trigger pulses, one for each signal state transition of the received square waveform. These trigger pulses are coupled to actuate a pulse generator 77 to issue accurately spaced pulses each of a precise duration. The pulse generator 77 is provided with an output terminal 78 for coupling the speed control apparatus to receive the speed representative pulses.

What is claimed is:

1. A magnetic tachometer comprising a first member of magnetically permeable material defining a surface extending circumaxially about an axis; a second member of magnetically permeable material positioned relative to the first member defining a surface extending circumaxially about said axis; means for supporting the first and second members for relative rotation about said axis with their said extending surfaces spaced opposed in rotational registration; means for varying the reluctance in a first flux path extending through the members and between the spaced opposed surfaces at a plurality of angular intervals about the axis as the members are relatively rotated; means for providing a second flux path of fixed reluctance separate from and magnetically parallel to the first flux path; a source of magnetic flux supported relative to the members and magnetically parallel flux paths to establish magnetic flux in the first flux path and in the second separate flux path; and a magnetic flux detector positioned to detect magnetic flux in one of the separate magnetically parallel paths.

2. The magnetic tachometer according to claim 1 wherein the magnetic flux detector is positioned to detect flux in the second flux path of fixed reluctance.

3. The magnetic tachometer according to claim 1 wherein the means for supporting the members for relative rotation includes a shaft of magnetically permeable material mounted for rotation about the axis and one of said members is fastened to the shaft for rotation therewith and is magnetically coupled to the shaft to form part of the second flux path of fixed reluctance.

4. The magnetic tachometer according to claim 3 wherein the magnetic flux detector includes an induction coil supported in a stationary position surrounding the shaft to permit said shaft to rotate relative to said coil.

5. The magnetic tachometer according to claim 4 wherein the first one of the members is a disc fastened at its center to the shaft for rotation about the axis, the disc is provided with serrations forming alternate projective and root segments along its surface extending circumaxially about the axis for varying the spacing between the members thereby establishing different reluctances, the second member includes an annular portion supported in a stationary position, the annular portion having serrations forming alternate projective and root segments along its surface extending circumaxially about the axis for varying the spacing between the members thereby establishing different reluctances, and the source of magnetic flux includes a permanent magnet supported in a stationary position at one side of the plane of the disc to couple magnetic flux from one of its poles to the disc while permitting the disc to rotate relative to the magnet.

6. The magnetic tachometer according to claim 5 wherein the disc has an axially extending surface about its circumferential perimeter defining its circumaxially extending surface, the serrations about the disc are located along the axially extending surface to form alternate projective and root segments about the axis with the projective segments spaced at regular angular intervals about the axis, the annular member is a cylindrical structure journally supported at its opposite ends to the shaft to permit the shaft to rotate relative thereto, the cylindrical structure is supported to surround the disc with a space therebetween, the cylindrical structure has a radial inwardly extending portion having an axially extending surface defining the circumaxially extending surface of the annular member, the serrations about the annular member are located along its axially extending surface to form alternate projective and root segments about the axis with the projective segments spaced the regular angular intervals about the axis, and the permanent magnet supported with its poles spaced from the disc and the cylinder and the shaft to form air gaps in the magnetic flux paths at its poles.

7. The magnetic tachometer according to claim 5 wherein the disc and the annular portion have the same number of alternate projective and root segments with the projective segments spaced the same regular angular intervals about the axis, and each of the projective segments has a tip of a finite width in the circumaxial direction with said tip width of each projective segment of one magnetically permeable member the same, the circumaxial width of the tips of the projective segments of the disc is smaller than the circumaxial width of the tips of the projective segments of the annular portion.

* * * * *